United States Patent
Yamaguchi

(10) Patent No.: US 9,736,328 B2
(45) Date of Patent: Aug. 15, 2017

(54) IMAGE FORMING APPARATUS AND METHOD FOR CONTROLLING AN IMAGE FORMING APPARATUS

(71) Applicant: KYOCERA Document Solutions Inc., Osaka (JP)

(72) Inventor: Hirofumi Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/363,548

(22) Filed: Nov. 29, 2016

(65) Prior Publication Data
US 2017/0163832 A1    Jun. 8, 2017

(30) Foreign Application Priority Data
Dec. 3, 2015  (JP) ................... 2015-236749

(51) Int. Cl.
| G06K 15/00 | (2006.01) |
| H04N 1/00 | (2006.01) |
| G06F 3/12 | (2006.01) |

(52) U.S. Cl.
CPC ....... *H04N 1/00896* (2013.01); *G06F 3/1211* (2013.01); *G06F 3/1286* (2013.01); *H04N 1/00411* (2013.01); *H04N 1/00891* (2013.01); *H04N 2201/0094* (2013.01)

(58) Field of Classification Search
None
See application file for complete search history.

(56) References Cited

U.S. PATENT DOCUMENTS

| 5,461,266 A * | 10/1995 | Koreeda ............... G06F 1/3203 307/125 |
| 9,335,696 B2 * | 5/2016 | Haraguchi ......... G03G 15/5004 |
| 9,635,205 B2 * | 4/2017 | Yokoyama ......... H04N 1/00896 |
| 2012/0303989 A1 * | 11/2012 | Hikichi ............. H04N 1/00891 713/323 |
| 2013/0297874 A1 * | 11/2013 | Kurokawa .......... G06F 12/0802 711/118 |
| 2014/0368855 A1 * | 12/2014 | Yamano ............... G06K 15/406 358/1.13 |

FOREIGN PATENT DOCUMENTS

JP    2002-144677    5/2002

* cited by examiner

*Primary Examiner* — Marcellus Augustin
(74) *Attorney, Agent, or Firm* — Stein IP, LLC

(57) ABSTRACT

An image forming apparatus has a normal mode and an energy-saving mode. The image forming apparatus includes a plurality of components, a power supply which stops supplying electric power to supply-stop parts in energy-saving mode, a monitor which makes the power supply restart supply of electric power to the supply-stop parts when a recovery factor to normal mode occurs (an interrupt signal occurs), an automatic recovery signal generator which inputs an automatic recovery signal, which is a kind of interrupt signal, to the monitor after completion of transition to energy-saving mode, and an arithmetic processor which, when an error occurs during the transition period, performs recovery preparation processing to have the automatic recovery signal input to the monitor after completion of transition to energy-saving mode.

11 Claims, 6 Drawing Sheets

IMAGE FORMING APPARATUS AND METHOD FOR CONTROLLING AN IMAGE FORMING APPARATUS

INCORPORATION BY REFERENCE

This application is based upon and claims the benefit of priority from the corresponding Japanese Patent Application No. 2015-236749 filed on Dec. 3, 2015, the entire contents of which are incorporated herein by reference.

BACKGROUND

The present disclosure relates to an image forming apparatus that has a normal mode and an energy-saving mode and that includes a monitor which monitors the state of the apparatus in the energy-saving mode.

An image forming apparatus such as a multifunction peripheral, a copier, a printer, or a facsimile machine has a normal mode and an energy-saving mode. The normal mode is a mode in which a job-executable state is maintained. The energy-saving mode is a mode in which the supply of electric power to some components is stopped to save electric power. There are known technologies, of which one example will be discussed below, for eliminating inconveniences encountered in a state where an image forming apparatus has made a transition to energy-saving mode.

Specifically, there is known a printing apparatus that counts, as conditions for transition to energy-saving mode, not only predetermined conditions for transition to energy-saving mode but also the fact that the printing apparatus is in a printing-enabled state so as to inhibit transition to energy-saving mode when printing is impossible. In this printing apparatus, a state with no abnormality (a printing-enabled state) is taken as a necessary condition for transition to energy-saving mode. This eliminates the need for various kinds of control (as for monitoring the duration of the printing-disabled state and for indicating a printing-disabled state in energy-saving mode) related to the energy-saving mode in a printing-disabled state. This helps simplify the control of the apparatus.

An image forming apparatus such as a multifunction peripheral, a copier, a printer, or a facsimile machine has a normal mode and an energy-saving mode in which less electric power is consumed than in the normal mode. The energy-saving mode is also called power-saving mode or sleep mode. When not in use (not executing any job, on standby), the image forming apparatus is left in energy-saving mode. This helps reduce the electric power consumed by the image forming apparatus.

In energy-saving mode, the supply of electric power to such parts of the image forming apparatus as a scanner, a printing engine, and a display panel for setting is stopped. The scanner reads a document to generate image data. The printing engine executes printing. In energy-saving mode, when a recovery factor, such as receipt of print data from a computer, occurs, the supply of electric power to those parts to which the supply of electric power has been stopped is restarted. Then, the image forming apparatus returns to normal mode (job-executable state).

Here, during transition to energy-saving mode, previously defined energy-saving mode transition processing is executed sequentially. During the transition period to energy-saving mode (during transition from normal mode to energy-saving mode), an error may occur.

SUMMARY

According to one aspect of the present disclosure, an image forming apparatus has a normal mode and an energy-saving mode in which supply of electric power to previously defined supply-stop parts is stopped to consume less electric power than in the normal mode. The image forming apparatus includes a plurality of components, a power supply, a monitor, an automatic recovery signal generator, and an arithmetic processor. The components, of which all or part are the supply-stop parts, constitute the image forming apparatus. The power supply supplies electric power to the supply-stop parts in the normal mode but stops supplying electric power to the supply-stop parts in the energy-saving mode. The monitor operates by being supplied with electric power from the power supply when transition to the energy-saving mode starts, and stops operating in the normal mode. On receiving in the energy-saving mode an interrupt signal indicating occurrence of a recovery factor from an interruption signal generator, the monitor makes the power supply restart supply of electric power to the supply-stop parts to make the image forming apparatus return to the normal mode. The automatic recovery signal generator inputs to the monitor an automatic recovery signal, which is a kind of the interrupt signal, after completion of the transition to the energy-saving mode. The arithmetic processor, which is one of the supply-stop parts, determines transition to the energy-saving mode on recognizing a transition condition to the energy-saving mode to be fulfilled in the normal mode, and makes the power supply stop supply of electric power to the respective supply-stop parts sequentially during the transition period starting at determination of the transition to the energy-saving mode and ending at completion of the transition to the energy-saving mode. When an error occurs during the transition period, the arithmetic processor performs recovery preparation processing to input the automatic recovery signal to the monitor after completion of the transition to the energy-saving mode.

According to another aspect of the present disclosure, a method for controlling an image forming apparatus includes: providing a normal mode; providing an energy-saving mode in which supply of electric power to previously defined supply-stop parts is stopped to consume less electric power than in the normal mode; supplying electric power to the supply-stop parts in the normal mode; stopping supply of electric power to the supply-stop parts in the energy-saving mode; the supply-stop parts being all or part of a plurality of components which constitute the image forming apparatus; making a monitor operate by supplying electric power thereto when starting transition to the energy-saving mode; making the monitor stop operating in the normal mode; when the monitor receives in the energy-saving mode an interrupt signal indicating occurrence of a recovery factor from an interruption signal generator, having supply of electric power restarted to the supply-stop parts to make the image forming apparatus return to the normal mode; when a transition condition to the energy-saving mode is fulfilled in the normal mode, determining transition to the energy-saving mode; stopping supply of electric power to the respective supply-stop parts sequentially during a transition period starting at determination of the transition to the energy-saving mode and ending at completion of the transition to the energy-saving mode; when an error occurs during the transition period, performing recovery preparation processing to input the automatic recovery signal to the monitor after completion of the transition to the energy-saving mode; and the automatic recovery signal being a kind of the interrupt signal.

Further features and advantages of the present disclosure will become apparent from the description of embodiments given below.

DETAILED DESCRIPTION

The present disclosure aims to prevent, even when an error occurs during transition to an energy-saving mode, the error from being unattended-to for a long time. The present disclosure aims also to prevent disability to return to a normal mode. Hereinafter, an embodiment of the present disclosure will be described with reference to FIGS. 1 to 6. As a example, an multifunction peripheral 100 (corresponding to an image forming apparatus) adopting electrophotography and capable of color printing will be described. The multifunction peripheral 100 has a normal mode and an energy-saving mode (deep-sleep mode) in which less electric power is consumed than in normal mode. All features, such as structures and arrangements, described in connection with the embodiment are merely examples for the sake of description, and are in no way meant to limit the scope of the disclosure.

Figure 1:
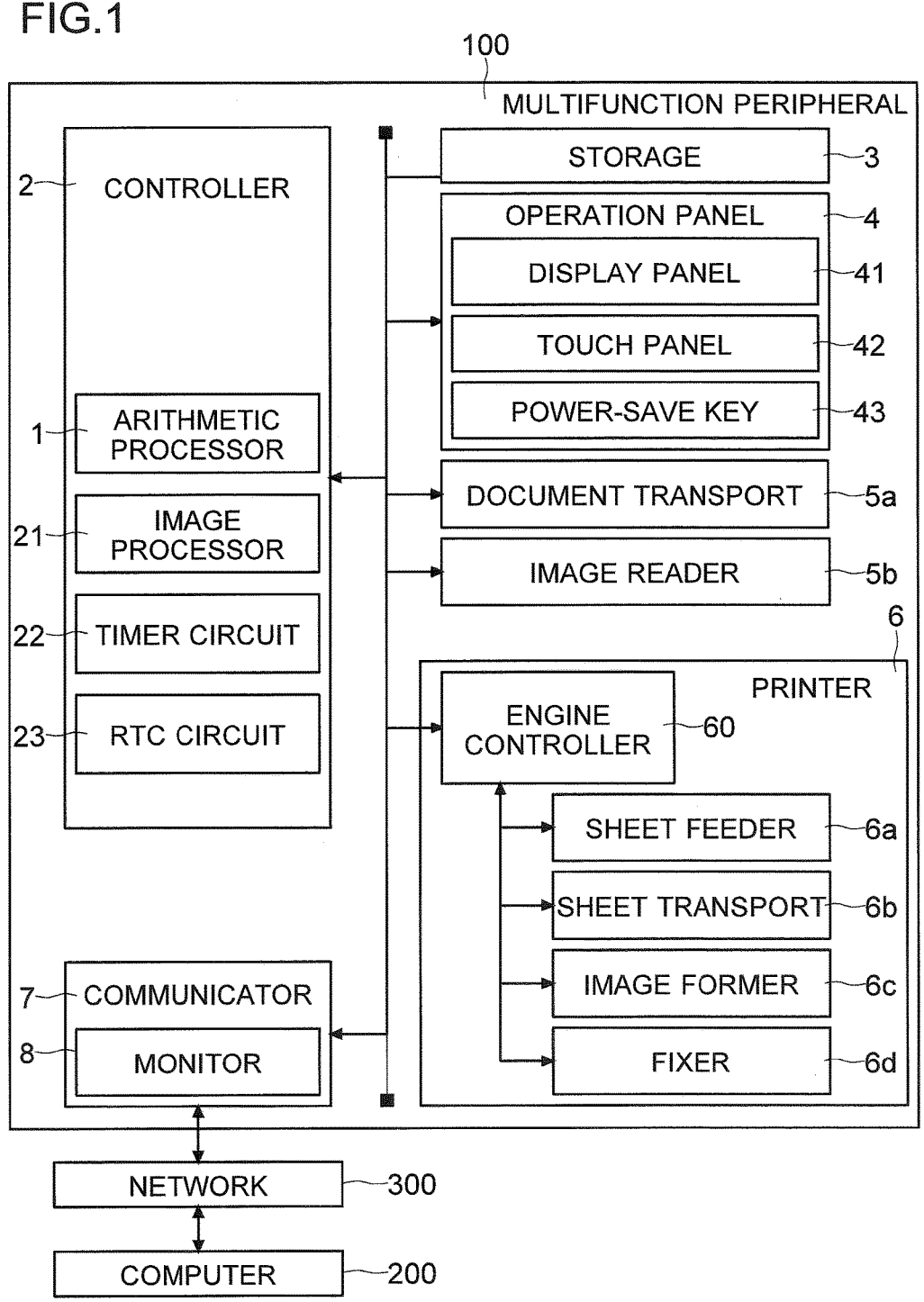
FIG. 1 is a diagram showing an example of a multifunction peripheral according to one embodiment.

Outline of an Image Forming Apparatus:

First, with reference to FIG. 1, the multifunction peripheral 100 according to the embodiment will be described.

The multifunction peripheral 100 includes a controller 2 (control circuit board). The controller 2 controls the operation of the components that constitute the multifunction peripheral 100. The components include, for example, a storage 3, an operation panel 4, a document transport 5a, an image reader 5b, a printer 6, and a communicator 7. The controller 2 includes an arithmetic processor 1, which performs calculation and control, and an image processor 21. The arithmetic processor 1 is an integrated circuit, such as a CPU, that performs processing, calculation, and control. The image processor 21 is a circuit that subjects image data to image processing necessary for printing.

The controller 2 also includes a timer circuit 22 and an RTC circuit 23 (real-time clock circuit) (these may be provided outside the controller 2). The timer circuit 22 is a circuit that makes its output signal rise and fall at predetermined time intervals. For example, the timer circuit 22 outputs a clock signal with a constant period. The output signal of the timer circuit 22 is input to the arithmetic processor 1. The output signal of the timer circuit 22 is used as an interrupt signal that is required by an OS such as Linux. The RTC circuit 23 is a clock that counts the time (current time). A back-up battery (unillustrated) is provided separately as a power source for the RTC circuit 23. Thus, even when the main power to the multifunction peripheral 100 is off, the RTC circuit 23 operates. Incidentally when the power to the multifunction peripheral 100 is on, the RTC circuit 23 may be operated not from the battery but from a voltage supplied to the controller 2.

The storage 3 includes storage devices such as ROM, RAM, and a HDD. The storage 3 stores programs and data for control. The controller 2 is communicably connected to the operation panel 4. The operation panel 4 includes a display panel 41 and a touch panel 42. The display panel 41 displays setting screens, the status of the multifunction peripheral 100, and information such as messages. The touch panel 42 is attached to the display panel 41. The touch panel 42 detects the coordinates of the position at which it is touched by a user. Based on the touch position recognized by the touch panel 42, an operation image (a key or button) operated by the user is identified.

The operation panel 4 also includes hardware keys. For example, a Save Power key 43 and a Start key are provided. The Save Power key 43 is a key for requesting a transition from normal mode to energy-saving mode. The Start key is a key for requesting execution of a job. The controller 2 controls the multifunction peripheral 100 so that this operates according to the settings made by the user on the operation panel 4.

The controller 2 is communicably connected to the document transport 5a and the image reader 5b. The document transport 5a and the image reader 5b are parts that read a document to generate image data. The document transport 5a transports a set document toward a reading position. The image reader 5b reads a document transported by the document transport 5a, or a document set on a document stage (contact glass, unillustrated). The image reader 5b generates image data. The controller 2 controls the operation of the document transport 5a and the image reader 5b.

The multifunction peripheral 100 includes the printer 6. The printer 6 includes an engine controller 60, a sheet feeder 6a, a sheet transport 6b, an image former 6c, and a fixer 6d. The engine controller 60 and the controller 2 are communicably connected together. The controller 2 feeds the engine controller 60 with a print instruction, the contents of a print job, and the image data used for printing. The engine controller 60 receives instructions from the controller 2. The engine controller 60 practically controls printing-related processes such as sheet feeding, sheet transport, toner image formation, transferring, and fixing.

The engine controller 60 makes the sheet feeder 6a feed out one sheet after another. The engine controller 60 makes the sheet transport 6b transport the fed sheet up to a discharge tray (unillustrated). The engine controller 60 makes the image former 6c form a toner image to be put on the sheet transported from the sheet transport 6b. Then, the engine controller 60 makes the fixer 6d fix the toner image transferred to the sheet.

The multifunction peripheral 100 includes a communicator 7. The controller 2 is communicably connected to the communicator 7. The communicator 7 communicates with a computer 200 such as a PC or server. Incidentally, as by a USB cable, the communicator 7 and the computer 200 may be connected together directly. The communicator 7 receives print data from the computer 200. The print data contains data written in a page-description language, image data, and print setting data. The controller 2 makes the printer 6 perform printing based on the print data.

Figure 2:
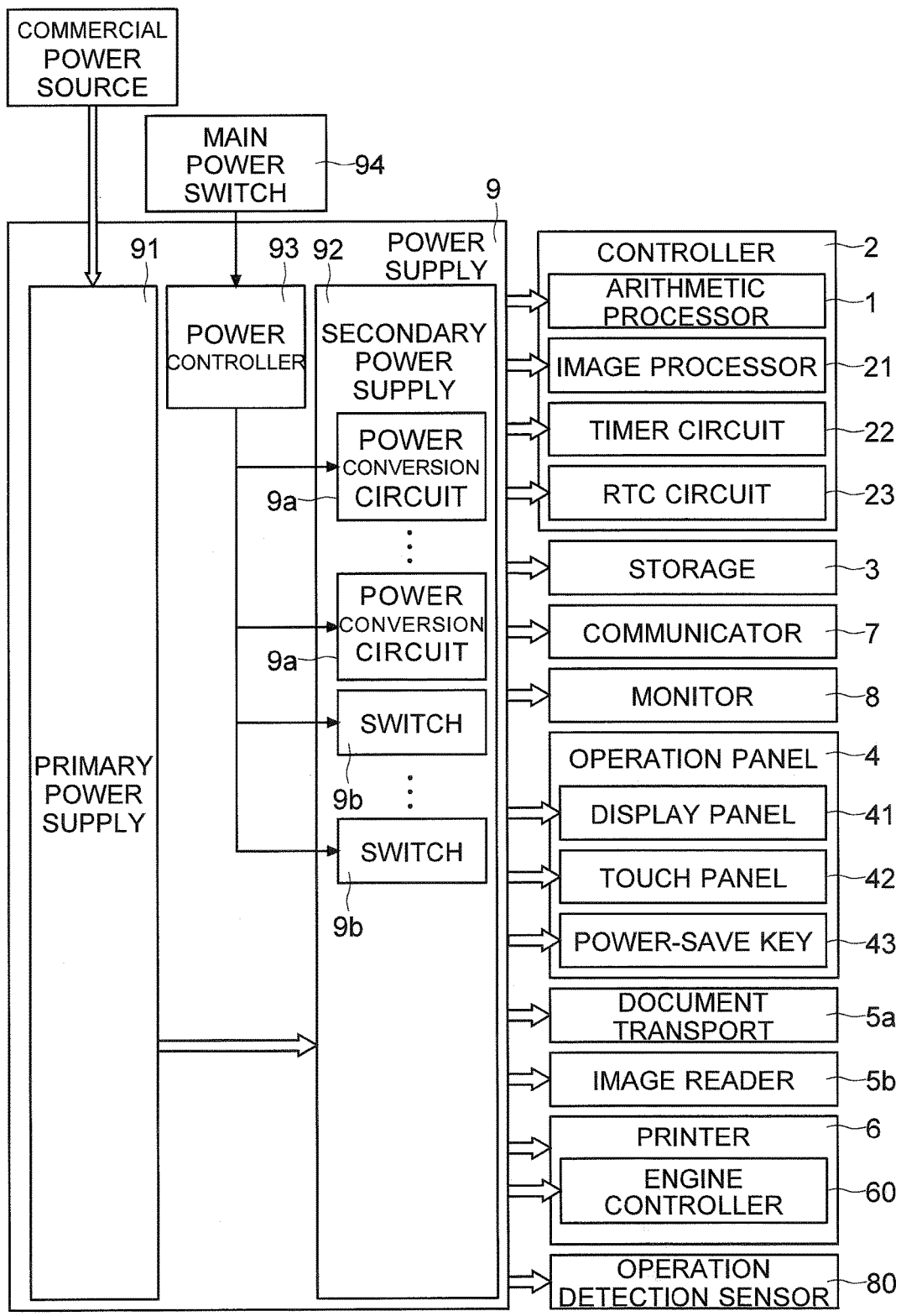
FIG. 2 is a diagram showing an example of an electric power supply system in the multifunction peripheral according to the embodiment.

Modes and Power Supply:

Next, with reference to FIG. 2, an example of modes and the supply of electric power to different blocks in the multifunction peripheral 100 according to the embodiment will be described. The multifunction peripheral 100 includes a power supply 9. The power supply 9 includes a primary power supply 91, a secondary power supply 92, and a power controller 93. The primary power supply 91 is connected to a commercial power source (alternating-current power source) by a power cable. The primary power supply 91 generates a direct-current voltage directly from the commercial power source (an alternating-current voltage). The primary power supply 91 generates and outputs a previously set voltage (e.g., DC 24 V for driving motors).

There are provided various circuits and devices in the multifunction peripheral 100. These circuits and devices require a plurality of different voltages to operate. In other words, a plurality of different voltages are required for the operation of the controller 2, the storage 3, the communicator 7, the operation panel 4, the document transport 5a, the image reader 5b, and the printer 6. Moreover, such devices (integrated circuits) as the arithmetic processor 1 and the image processor 21 can each require a plurality of different voltages. Accordingly, the secondary power supply 92 generates a plurality of different direct-current voltages based on the voltage generated by the primary power supply 91.

For the generation of a plurality of different voltages, the secondary power supply 92 includes a plurality of power conversion circuits 9a. The power conversion circuits 9a are each a DC converter or a regulator. The values of the voltages to be output by the respective power conversion circuits 9a are previously set. In other words, the power conversion circuits 9a generate voltages of predetermined levels respectively. The secondary power supply 92 generates and supplies voltages of such levels as are required for the operation of the components (the controller 2, the storage 3, the operation panel 4, the document transport 5a, the image reader 5b, the printer 6, and the communicator 7).

The secondary power supply 92 supplies voltages to different parts of the controller 2 (the arithmetic processor 1, the image processor 21, the timer circuit 22, and the RTC circuit 23), the storage 3, different parts in the operation panel 4 (the display panel 41, the touch panel 42, and the hardware keys), the document transport 5a (control devices for controlling document transport and a memory within the document transport 5a), the image reader 5b (an image sensor, a light source, control devices for controlling image reading, and a memory within the image reader 5b), the printer 6 (the engine controller 60 and other devices provided in the printer 6), and the communicator 7. The secondary power supply 92 supplies voltages required for operation also to a monitor 8 and an operation detection sensor 80 for detecting a recovery factor (which will be described in detail later).

The multifunction peripheral 100 has a normal mode and an energy-saving mode. For example, in normal mode, the engine controller 60 turns on and off the heater in the fixer 6d. Thus, the fixer 6d is kept at a temperature at which fixing is possible. However, in normal mode, even in a standby state, where no job is being executed, a given amount of electric power is consumed by the controller 2 and other components.

The energy-saving mode is a mode for reducing the electric power consumed in the standby state. In energy-saving mode, of those parts to which electric power is supplied in normal mode, some, called supply-stop parts, stop being supplied with electric power. Which parts of the multifunction peripheral 100 to take as supply-stop parts can be determined as desired. In the multifunction peripheral 100, the arithmetic processor 1 and the image processor 21 in the controller 2 are taken as supply-stop parts. Also, for each component, which of the members constituting it to take as supply-stop parts can be determined.

The multifunction peripheral 100 is provided with a main power switch 94. The main power switch 94 is provided on the operation panel 4 or on a side face of the multifunction peripheral 100. The main power switch 94 is a switch for turning the main power on and off. When the main power switch 94 is operated, the multifunction peripheral 100 starts up to operate in normal mode. The normal mode can be said to be a mode in which the multifunction peripheral 100 is kept ready to execute jobs such as printing, scanning, and transmission.

When a transition condition is fulfilled in normal mode, the multifunction peripheral 100 makes a transition to energy-saving mode. A transition condition is a previously defined condition of which the fulfillment induces transition to energy-saving mode. When a previously defined transition time passes with no operation or input made on the multifunction peripheral 100 after inception of normal mode or after completion of a job executed in normal mode, the controller 2 recognizes that a transition condition is fulfilled. This occurs when, for example, no input is made on the operation panel 4 after inception of the standby state and thus the transition time has elapsed without the communicator 7 receiving any print data. The transition time can be set through input on the operation panel 4. The transition time can be set to be any length of time in the range of ten and several seconds to several tens of minutes. Also when the Save Power key 43 provided on the operation panel 4 is operated, the controller 2 recognizes that a transition condition is fulfilled. When a transition condition is fulfilled, the controller 2 gives the power controller 93 an instruction. The controller 2 makes the power controller 93 stop supplying electric power to the supply-stop parts.

On the other hand, when a previously defined recovery factor occurs in energy-saving mode, the multifunction peripheral 100 returns to normal mode (a recovery factor will be described in detail later). In energy-saving mode, a monitor 8 monitors whether or not a recovery factor has occurred. When transition to energy-saving mode is started, the power supply 9 starts to supply the monitor 8 with electric power. The power supply 9 supplies the monitor 8 with electric power even in energy-saving mode. The monitor 8 is a part that is operated in energy-saving mode. Accordingly, the controller 2 makes the power supply 9 stop supplying the monitor 8 with electric power in normal mode. When a recovery factor occurs, the monitor 8 gives the power controller 93 an instruction. The monitor 8 makes the power controller 93 restart the supply of electric power to the supply-stop parts.

Some of the power conversion circuits 9a supply electric power to both supply-stop parts and parts that are supplied with electric power even in energy-saving mode. To enable them to only stop supplying electric power to supply-stop parts, a switch 9b is provided. The switch 9b is a switching device such as a transistor. A plurality of switches 8b may be provided. The switch 9b is provided between the supply-stop parts and the power conversion circuit 9a.

The power supply 9 includes the power controller 93. The power controller 93 turns each power conversion circuit 9a on and off, and turns each switch 9b on and off. To prevent malfunction, the order in which (the timing with which) electric power starts to be supplied to different parts (e.g., the arithmetic processor 1, the image processor 21, the communicator 7, and the engine controller 60) of the multifunction peripheral 100 and the order in which electric power stops being fed to them are previously defined. The power controller 93 is a sequencing circuit that turns the power conversion circuits 9a and the switches 9b on and off in the previously defined orders so as not to cause malfunction.

Operating the main power switch 94 turns on the main power to the multifunction peripheral 100. When the main power is turned on, the power controller 93 makes the power conversion circuits 9a start to operate in the previously defined order, at previously defined time points respectively. The power controller 93 also turns the switches 9b on at previously defined time points respectively. When the main power is turned on, those parts to which electric power should be supplied in normal mode starts to be supplied with electric power in due order. Whichever part has started to be supplied with electric power starts start-up processing. When all the parts which have started to be supplied with electric power have completely started up, the multifunction peripheral 100 enters normal mode.

For transition from normal mode to energy-saving mode, the power controller 93 turns off those power conversion circuits 9a and switches 9b which supply electric power to the supply-stop parts in the previously defined order, at previously defined time points respectively. Transition to energy-saving mode is complete when all the supply-stop parts stop being supplied with electric power.

For return from energy-saving mode to normal mode, the power controller 93 turns on those power conversion circuits 9a and switches 9b which supply electric power to the supply-stop parts in the previously defined order, at previously defined time points respectively. Thus, the supply of electric power to the supply-stop parts is restarted sequentially. Whichever part has started to be supplied with electric power again starts start-up processing. Return to normal mode is complete when all the supply-stop parts finish restarting.

Operating the main power switch 94 turns off the main power to the multifunction peripheral 100. When the main power is turned off, the power controller 93 makes the power conversion circuits 9a stop operating in the previously defined order, at previously defined time points respectively. The power controller 93 also turns off the switches 9b at previously defined time points respectively.

Figure 3:
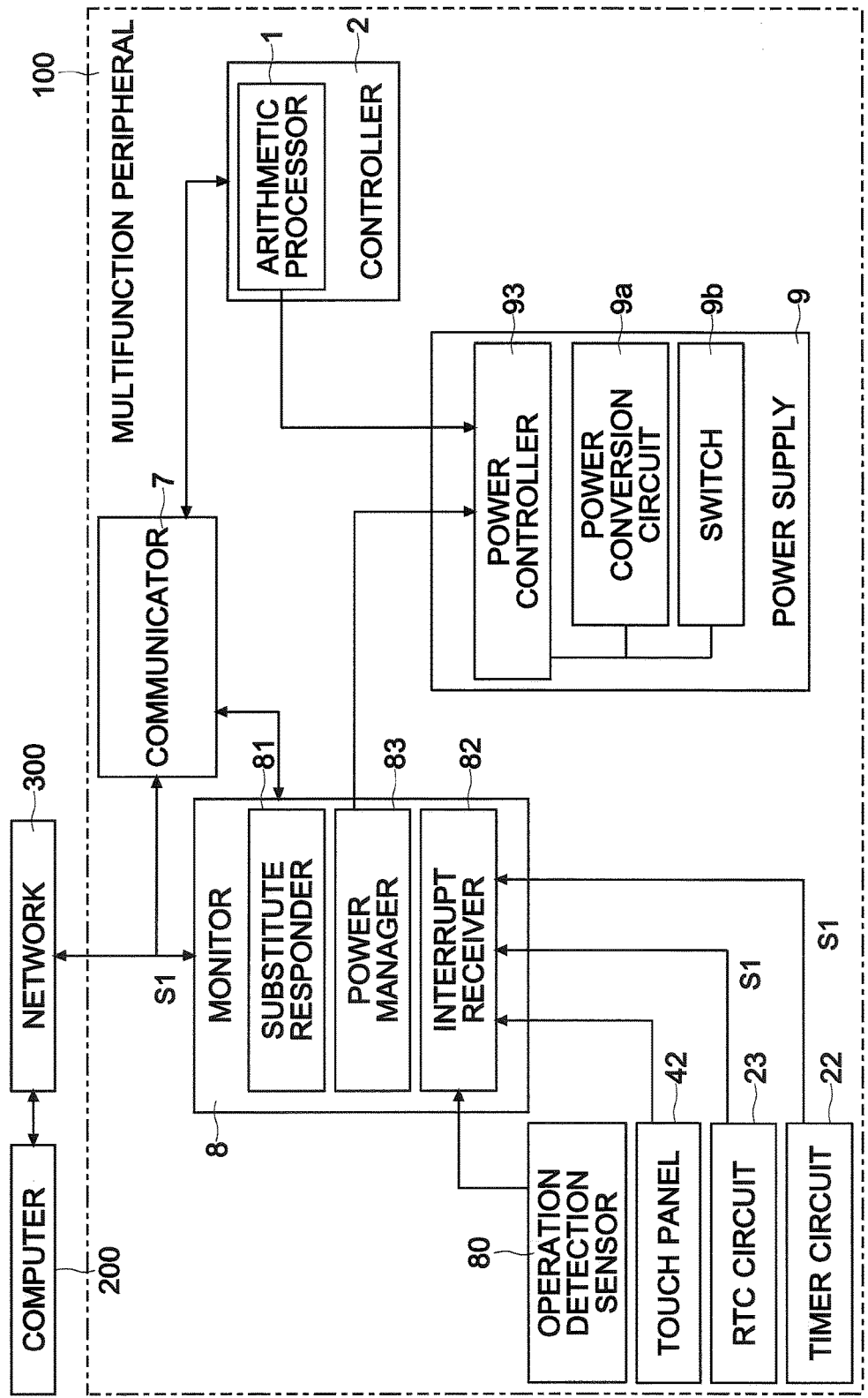
FIG. 3 is a diagram showing an example of a monitor according to the embodiment.

Monitor 8: Next, with reference to FIG. 3, the monitor 8 according to the embodiment will be described. As shown in FIG. 3, the monitor 8 includes a substitute responder 81, an interrupt receiver 82, and a power manager 83. The interrupt receiver 82 is an interface circuit for receiving an interrupt signal. The substitute responder 81 and the power manager 83 are small integrated circuits such as microcomputers.

The monitor 8 (the interrupt receiver 82, the power manager 83, and the substitute responder 81) operates in energy-saving mode. The substitute responder 81 is connected to a network 300. In energy-saving mode, the substitute responder 81 performs response processing to part of requests from the network 300. That is, in energy-saving mode, the substitute responder 81 substitutes for the communicator 7. The substitute responder 81 permits the supply of electric power to the communicator 7 to be stopped in energy-saving mode.

The substitute responder 81 performs, for example, response processing to an echo request by Ping from the network 300. The substitute responder 81 also performs response processing to requests in a protocol related to the network 300, such as DHCP and SNMP.

On receiving an interrupt signal from an interrupt signal generator in energy-saving mode, the monitor 8 makes the power supply 9 restart the supply of electric power to the supply-stop parts. The monitor 8 thereby makes the image forming apparatus return to normal mode. A plurality of interrupt signal generators are provided in the multifunction peripheral 100. The interrupt signal generators output an interrupt signal that notifies occurrence of a recovery factor. The interrupt receiver 82 receives interrupt signals.

The multifunction peripheral 100 is provided with a plurality of sensors. The plurality of sensors include operation detection sensors 80 for detecting operation by a user on the multifunction peripheral 100. The operation detection sensors 80 are used as interrupt signal generators. For example, a sensor for detecting the loading and unloading of a sheet cassette (unillustrated) in the sheet feeder 6a, a sensor for detecting whether a maintenance cover of the multifunction peripheral 100 is open or closed, a sensor for detecting whether a document is set on the document transport 5a, and a sensor for detecting whether the document transport 5a is raised or lowered (open or closed) are used as interrupt signal generators. When operation by a user is detected, the operation detection sensors 80 shift the level of their output signal (high to low to high, or low to high to low).

The touch panel 42 can be used as an interrupt signal generator. When the touch panel 42 on the operation panel 4 is touched in energy-saving mode, the touch panel 42 inputs an interrupt signal notifying the touch to the interrupt receiver 82.

The RTC circuit 23 and the timer circuit 22 can be used as an interrupt signal generator. When an error occurs during transition to energy-saving mode, the RTC circuit 23 or the timer circuit 22 or the both input an interrupt signal to the interrupt receiver 82 (details will be given later). When no error occurs during transition to energy-saving mode, the RTC circuit 23 and the timer circuit 22 do not input an interrupt signal to the interrupt receiver 82.

The substitute responder 81 can also be used as an interrupt signal generator. On receiving a particular packet from the computer 200, the substitute responder 81 recognizes occurrence of a recovery factor. The particular packet is a packet to be processed by the controller 2 and the communicator 7, such as print data. In this case, the substitute responder 81 inputs an interrupt signal to the interrupt receiver 82.

The output signals of the operation detection sensors 80, the RTC circuit 23, and the timer circuit 22 are input to the interrupt receiver 82. In energy-saving mode, when the interrupt receiver 82 receives an interrupt signal, the interrupt receiver 82 notifies the power manager 83 of occurrence of a recovery factor. When the substitute responder 81 receives a particular packet, the substitute responder 81 notifies the power manager 83 of occurrence of a recovery factor. Based on such notifications, the power manager 83 recognizes occurrence of a recovery factor. On recognizing occurrence of a recovery factor, the power manager 83 instructs the power supply 9 (power controller 93) to return to normal mode and to restart the supply of electric power to the supply-stop parts. Thus, return from energy-saving mode to normal mode takes place. In this way, the monitor 8 performs limited processing such as substitute response, interrupt signal receipt, and recovery factor occurrence recognition. Accordingly, the monitor 8 has a smaller circuit scale and consumes less power than the communicator 7 or the controller 2.

Figure 4:
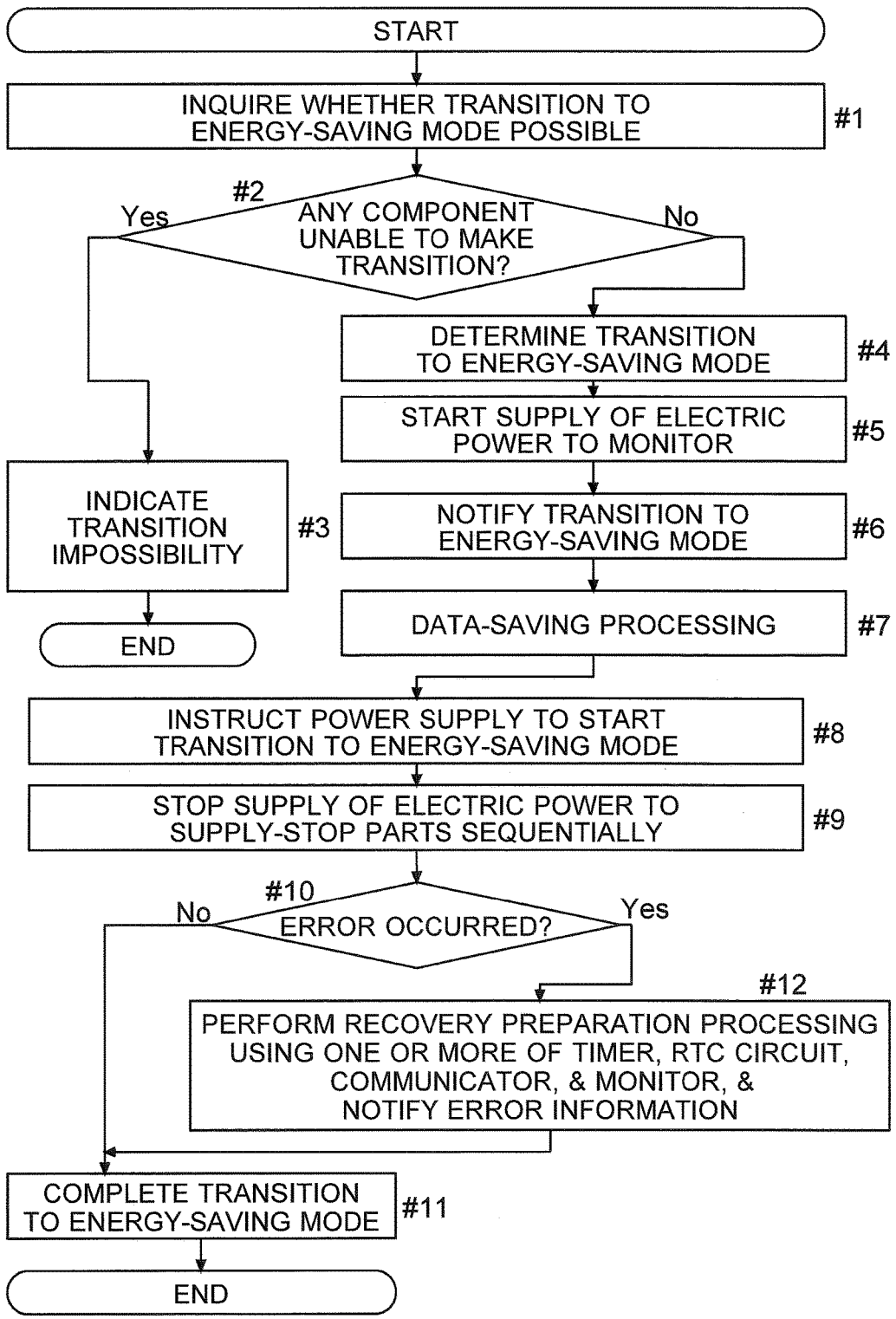
FIG. 4 is a flow chart showing an example of a flow of transition from normal mode to energy-saving mode in the multifunction peripheral according to the embodiment.

Flow of Transition from Normal Mode to Energy-Saving Mode:

Next, with reference to FIG. 4, a description will be given of an example of the flow of transition from normal mode to energy-saving mode. The flow in FIG. 4 starts when, in normal mode, the controller 2 (arithmetic processor 1) recognizes that a transition condition is fulfilled. First, the arithmetic processor 1 inquires of the components (the storage 3, the operation panel 4, the document transport 5a, the image reader 5b, the printer 6, and the communicator 7) whether or not they can make a transition to energy-saving mode (Step #1).

Based on the replies from the components, the arithmetic processor 1 checks whether or not there is any component that cannot make a transition (Step #2). A control circuit (e.g., a CPU) included in a component that is executing a job replies to the arithmetic processor 1 that it cannot make a transition. For example, the Save Power key 43 may be operated during execution of a copying job. In that case, the printer 6 (engine controller 60), the document transport 5a, and the image reader 5b reply that they cannot make a transition.

The arithmetic processor 1 may receive a request (wait request) to wait for transition to energy-saving mode from one of the components. For example, in a case where the communicator 7 is conducting data communication and in addition the data communication will end within a previously defined wait time, such as about one second, the communicator 7 sends a wait request to the arithmetic processor 1. For another example, when the printer 6 is printing the last page, the engine controller 60 may send a wait request to the arithmetic processor 1. On receiving a wait request, so long as there is no other component that cannot make a transition, the arithmetic processor 1 wait until the component that has sent the wait request replies whether it can or cannot make a transition. That is, on receiving a wait request, the arithmetic processor 1 continues to check whether or not it is possible to make a transition to energy-saving mode.

When Step #2 results in Yes, in most cases it is considered to result from the Save Power key 43 being operated despite during job execution. When there is any component that replies that it cannot make a transition (Step #2, Yes), the arithmetic processor 1 makes the display panel 41 display transition impossibility (transition error) (Step #3). Then the flow ends.

When there is no component that replies that it cannot make a transition (Step #2, No), the arithmetic processor 1 determines transition to energy-saving mode (Step #4). That is, the arithmetic processor 1 recognizes that a condition for transition to energy-saving mode is fulfilled and a transition to energy-saving mode should be made. On determining transition to energy-saving mode, the arithmetic processor 1 makes the power supply 9 (power controller 93) start to supply electric power to the monitor 8 (Step #5). Incidentally, in normal mode, the arithmetic processor 1 makes the power supply 9 stop supplying electric power to the monitor 8. During a transition period, the arithmetic processor 1 has supply of electric power to the monitor 8 started. The monitor 8 operates starting in the middle of the transition period until return to normal mode.

The arithmetic processor 1 notifies each component of transition to energy-saving mode (Step #6). When a transition to energy-saving mode is made, based on that notification, the arithmetic processor 1 and specific components perform data-saving processing (Step #7). The specific components are those that are determined to perform data-saving processing. The specific components are, for example, the printer 6, the document transport 5a, the image reader 5b, and the storage 3.

The CPUs (unillustrated) within the circuit boards of the engine controller 60, the document transport 5a, and the image reader 5b respectively make the storage 3 (a HDD or a non-volatile storage device such as ROM) store data stored in the memory (unillustrated) within those circuit boards. The RAM in the storage 3 makes the storage 3 (HDD or ROM) store data to be saved. Also the controller 2 performs saving processing. The arithmetic processor 1 makes the storage 3 (HDD or ROM) store the data to be saved out of the data held by the arithmetic processor 1 itself and the data held in the circuits within the controller 2.

Subsequently, the arithmetic processor 1 instructs the power controller 93 to start transition to energy-saving mode (Step #8). In response to the instruction, the power controller 93 stops supply of electric power to supply-stop parts sequentially in a previously defined order, with previously defined timing (Step #9). For example, the power controller 93 stops supply of electric power to the display panel 41 first among a plurality of supply-stop parts. On the other hand, the power controller 93 stops supply of electric power to the arithmetic processor 1 last among a plurality of supply-stop parts. In this way, during a transition period after determination to make a transition up to completion of the transition, the arithmetic processor 1 makes the power supply 9 stop supply of electric power to supply-stop parts sequentially.

During the transition period, the arithmetic processor 1 checks whether or not an error has occurred in the controller 2 and whether or not a notification of error occurrence has been received from any component or the monitor 8 (Step #10). When no error occurs during the transition period (Step #10, No), the transition to energy-saving mode is complete (Step #11). Then the flow ends (END).

On the other hand, when an error occurs during the transition period (Step #10, Yes), the arithmetic processor 1 performs recovery preparation processing (Step #12). The recovery preparation processing is processing for making an automatic recovery signal generator generate an automatic recovery signal S1 after completion of transition to energy-saving mode. The automatic recovery signal S1 is a kind of interruption signal. As the recovery preparation processing, the arithmetic processor 1 notifies the monitor 8 of the content of the error that has occurred (error information) and has it stored in a memory (unillustrated) in the monitor 8 (Step #12).

The timer circuit 22, the RTC circuit 23, the communicator 7, and the monitor 8 can be used as the automatic recovery signal generator. The arithmetic processor 1 uses one or more of the timer circuit 22, the RTC circuit 23, the communicator 7, and the monitor 8 as the automatic recovery signal generator.

The output signal of the timer circuit 22 is, as the automatic recovery signal S1 (interrupt signal), input to the monitor 8 (see FIG. 3). When an error occurs during the transition period (Step #10, Yes), the arithmetic processor 1 gives the power supply 9 (power controller 93) an instruction to continue to supply electric power to the timer circuit 22 even during the transition period and after completion of transition to energy-saving mode. This processing (instruction) is the recovery preparation processing. Based on the instruction, the power controller 93 continues to supply electric power to the timer circuit 22 even after transition to energy-saving mode. After transition to energy-saving mode, the timer circuit 22 continues to issue a signal with a constant period. This signal is, as the automatic recovery signal S1, input to the monitor 8. Supply of electric power to the timer circuit 22 is continued even after transition to energy-saving mode. Accordingly, the power controller 93 (power supply 9) makes operate the power conversion circuit 9a, which generates the operating voltage for the timer circuit 22.

On the other hand, when no error occurs during the transition period (when no instruction to make the timer circuit 22 operate even after energy-saving mode is received), then, when transition to energy-saving mode is complete, the power supply 9 stops supplying electric power to the timer circuit 22. In energy-saving mode, electric power is supplied in some cases and is not supplied in other cases. Accordingly, for the timer circuit 22, one power conversion circuit 9a or switch 9b may be provided. The power controller 93 controls the power conversion circuit 9a or switch 9b provided for the timer circuit 22.

The RTC circuit 23 uses a battery as a power source. The RTC circuit 23 counts time. The RTC circuit 23 is connected to the monitor 8. The RTC circuit 23 can be made to output an interrupt signal at a specified time. Accordingly, when an error occurs during the transition period, the arithmetic processor 1 specifies a time point after completion of transition to energy-saving mode. The arithmetic processor 1 gives the RTC circuit 23 an instruction to output the automatic recovery signal S1 to the monitor 8 at the specified time point. This instruction serves as the recovery preparation processing. The RTC circuit 23 inputs the automatic recovery signal S1 to the monitor 8 at the specified time point.

The arithmetic processor 1 specifies a time point at which transition to energy-saving mode is expected to have been complete. By experiments, the time required for transition from normal mode to energy-saving mode is measured previously. The arithmetic processor 1 specifies a time point later than the time point of occurrence of the error by a length of time calculated by adding a predetermined margin to the measured required time.

When an error occurs during the transition period, the arithmetic processor 1 may make the communicator 7 or the monitor 8 transmit a request to return the automatic recovery signal S1. This request is issued to the computer 200 connected via the network 300. Incidentally, the power supply 9 stops supplying electric power to the communicator 7 during the transition period. In a case where the communicator 7 is operating when an error occurs, the arithmetic processor 1 may make the communicator 7 transmit the request. In a case where the communicator 7 is not operating when an error occurs, the arithmetic processor 1 may make the monitor 8 transmit the request. The arithmetic processor 1 may make the monitor 8 transmit the request irrespective of whether or not the communicator 7 is operating.

The arithmetic processor 1 makes the communicator 7 or the monitor 8 issue the request to the computer 200. The computer 200 transmits to the multifunction peripheral 100 such a signal that the monitor 8 recognizes a recovery factor to have occurred. For example, the arithmetic processor 1 makes the communicator 7 or the monitor 8 transmit a request for a particular packet. The particular packet is such a packet that the monitor 8 recognizes a recovery factor to have occurred. After completion of transition to energy-saving mode, the monitor 8 recognizes as the automatic recovery signal S1 the response signal from the computer 200 in response to the request.

After the recovery preparation processing at Step #12, transition to energy-saving mode is continued. The flow then proceeds to Step #11. As a result, even when an error occurs during the transition period, the multifunction peripheral 100 is temporarily brought into energy-saving mode (END).

When the monitor 8 locks, no return to normal mode is possible. Accordingly, the arithmetic processor 1 may perform the recovery preparation processing only when a particular error has occurred. The particular error is an error that can cause the monitor 8 to lock. The arithmetic processor 1 may perform the recovery preparation processing only when an error that can cause the monitor 8 to lock has occurred. This corresponds to, for example, when a notification of error occurrence of noise intrusion is received from the monitor 8, and when a notification to the effect that an abnormal packed has been received from the network 300 is received from the monitor 8. It is undesirable that the multifunction peripheral 100 is left in energy-saving mode for a long time without a user being notified of failure occurrence. Accordingly, the arithmetic processor 1 may preform the recovery preparation processing when a notification of failure occurrence is received from any component during the transition period.

That is, the arithmetic processor 1 preforms the recovery preparation processing when any of errors of noise intrusion, abnormal packet receipt, and failure has occurred during the transition period. The arithmetic processor 1 may not perform the recovery preparation processing when an error other than errors of noise intrusion, abnormal packet receipt, and failure has occurred.

Figure 5:
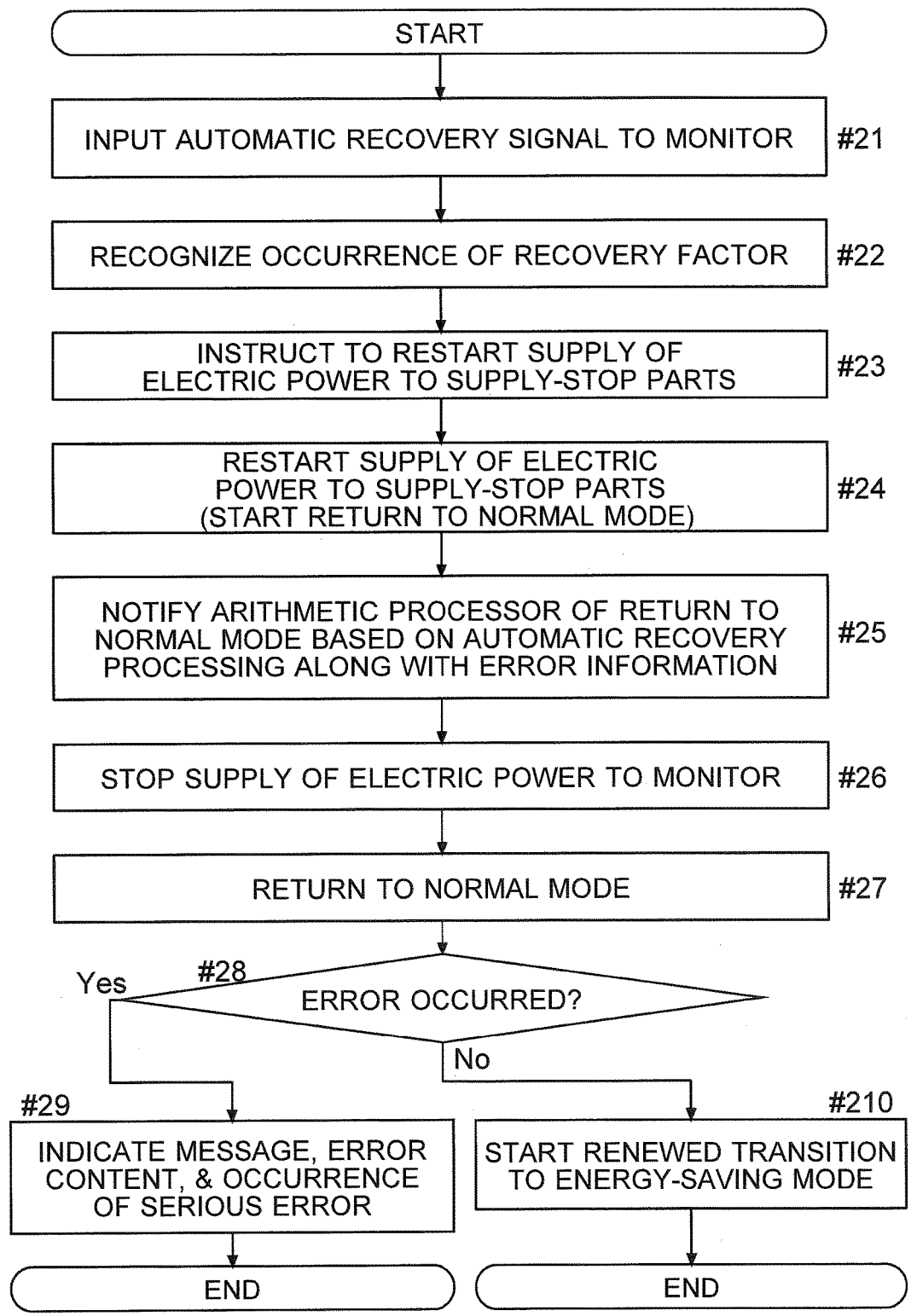
FIG. 5 is a flow chart showing an example of a flow of processing executed when a transition to energy-saving mode has been made with recovery preparation processing according to the embodiment performed.

Processing after Transition to Energy-Saving Mode with Recovery Preparation Processing Performed:

Next, with reference to FIG. 5, an example of the flow of processing after a transition to energy-saving mode is made with the recovery preparation processing performed.

In a case where a transition to energy-saving mode is made with the recovery preparation processing performed, on transition to energy-saving mode (immediately after the transition), the automatic recovery signal S1 (interrupt signal) is input to the monitor 8 (Step #21). Based on the automatic recovery signal S1, the monitor 8 recognizes a recovery factor to have occurred (Step #22), The monitor 8 instructs the power supply 9 to restart supply of electric power to the supply-stop parts (Step #23).

In response to the instruction, the power supply 9 (power controller 93) starts renewed supply of electric power to the supply-stop parts in the previously defined order, with the previously defined timing (Step #24). That is, return to normal mode is started (Step #24). In response to restarted supply of electric power, the respective supply-stop parts start start-up processing. For example, the supply-stop parts such as the arithmetic processor 1, the storage 3, the image processor 21, and the engine controller 60 are started up again.

The monitor 8 notifies the arithmetic processor 1 of the fact that the return to normal mode this time is based on recovery preparation processing and of the error information that the monitor 8 has been holding (Step #25). The arithmetic processor 1 governs the control of the multifunction peripheral 100. Accordingly, the arithmetic processor 1 returns at a comparatively early stage after the start of return to normal mode. At Step #25, the arithmetic processor 1 has already started up. On the other hand, the power supply 9 continues supplying electric power to the monitor 8 at least until the notification at Step #25 is made. After Step #25, the power supply 9 stops supplying electric power to the monitor 8 (Step #26).

Supply of electric power to all the supply-stop parts is restarted, and the multifunction peripheral 100 returns to normal mode (Step #27). For example, the arithmetic processor 1 establishes communication with the individual components. Having notified of completion of start-up by all the components, the arithmetic processor 1 recognizes completion of return to normal mode. After the return to normal mode, the arithmetic processor 1 inquires of each component whether or not there is an error to check whether or not an error is occurring (Step #28).

When an error is occurring (Step #28, Yes), the arithmetic processor 1 makes the display panel 41 display a message and the content of the error (Step #29). The message conveys that an error is occurring. Incidentally, the arithmetic processor 1 may make the communicator 7 transmit data indicating the content of the error occurring. The computer 200 as the transmission destination is defined previously. In this case, the communicator 7 too serves as an indicator that indicates an error.

When restarting the relevant parts does not resolve the error and the same error that occurred during the transition period to energy-saving mode is occurring, the arithmetic processor 1 may make the indicator (the display panel 41, the communicator 7) indicate occurrence of an irreparable error (serious error) (Step #29). Then the flow ends (END). When the end is reached via Step #29, the arithmetic processor 1 makes the display panel 41 continue display of the error (the display at Step #29) until it is recognized that the error has been confirmed. The arithmetic processor 1 recognizes error confirmation when there is input on the operation panel 4.

When no error is occurring (Step #28, No), it is likely that restarting (resetting) by renewed supply of electric power has resolved the error. Accordingly, the arithmetic processor 1 starts renewed transition to energy-saving mode (Step #210, then END). Specifically, at Step #210, the arithmetic processor 1 starts the flow chart in FIG. 4.

Modified Example

Figure 6:
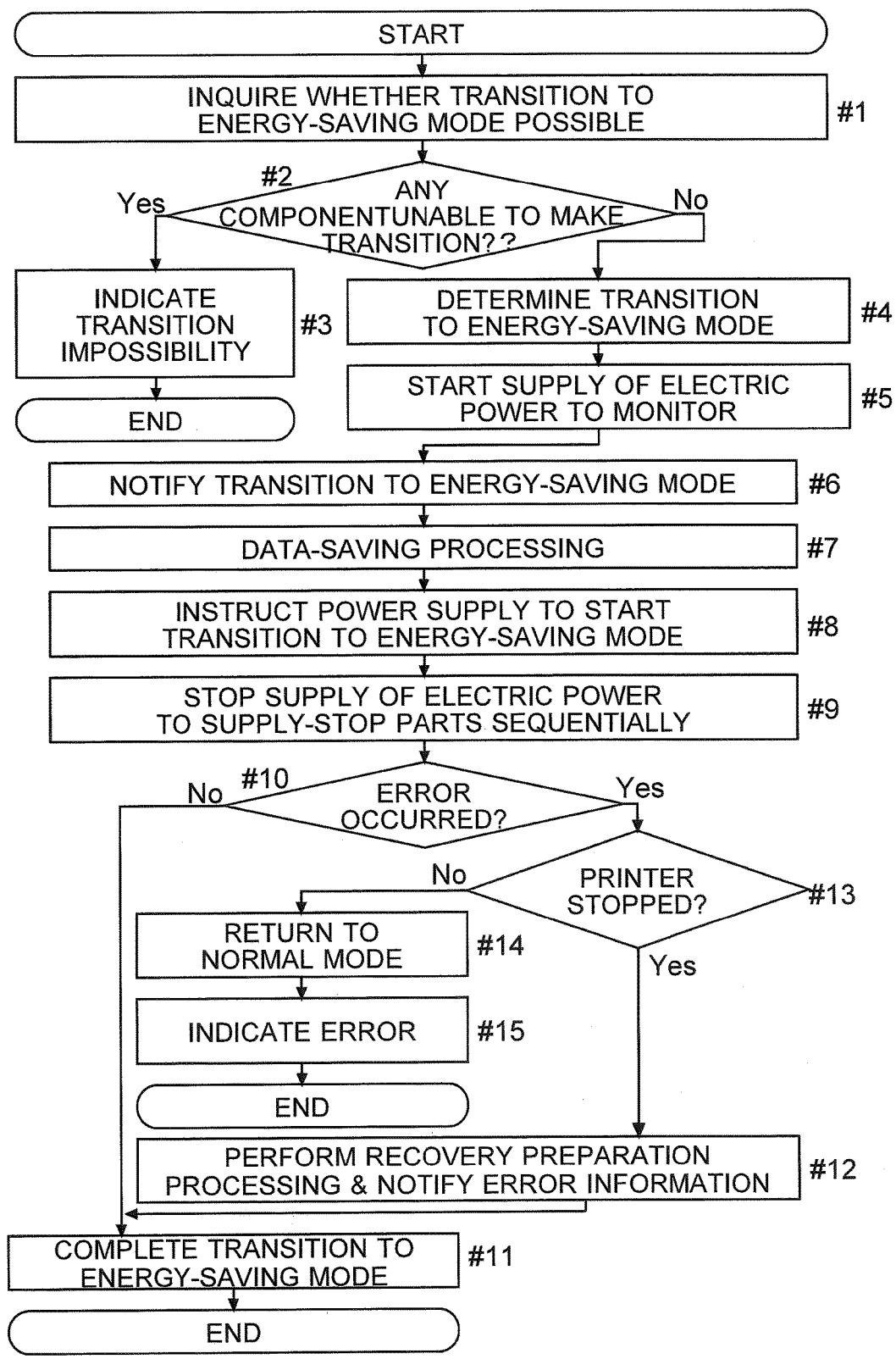
FIG. 6 is a flow chart showing an example of a flow of transition from normal mode to energy-saving mode in a multifunction peripheral according to a modified example.

Next, with reference to FIG. 6, a modified example will be described. In the flow chart in FIG. 6, Steps #1 to #12 are the same as those in FIG. 4. For these steps, to which the previously given description applies, no overlapping description will be repeated. In FIG. 6, as compared with FIG. 4, Steps #13, #14, and #15 are added.

The description thus far has dealt with an example in which, when an error occurs after the start of transition to energy-saving mode before completion of the transition to energy-saving mode, recovery preparation processing is performed irrespective of the time point of occurrence of the error. In this example, when an error occurs during a transition period, depending on the time point of occurrence of the error, the arithmetic processor 1 interrupts the transition to energy-saving mode. That is, after the start of transition to energy-saving mode, if an error occurs at a time point before a previously defined branch time point, the arithmetic processor 1 effects a return to normal mode; if an error occurs at or after the branch time point, the arithmetic processor 1 effects a transition to energy-saving mode. The arithmetic processor 1 handles an error that occurs at or after the branch time point as an error that occurs in a period in which transition to energy-saving mode cannot be canceled.

Here, the printer 6 (engine controller 60), once stopped, takes a predetermined amount of time to restart. Moreover, the engine controller 60 makes the rotary members included in the sheet feeder 6a, the sheet transport 6b, the image former 6c, and the fixer 6d rotate for operation checks. Operating noise occurs in the process of restarting. Abruptly started operation may baffle the user. Furthermore, during transition to energy-saving mode, the printer 6 stops. Therefore, after interrupting the transition and restarting the printer 6 to return to normal mode may complicate the control program.

Compared with cancelling transition to energy-saving mode and restarting the printer 6 (engine controller 60) to return to normal mode, making a complete transition to energy-saving mode temporarily and then returning to normal mode eliminates the need to develop a complicated program, or complicated software. Accordingly, this modified example deals with an example where the time point at which the printer 6 (engine controller 60) stops being supplied with electric power is taken as the branch time point.

When, at Step #10, an error occurs during the transition period (Step #10, Yes), in this modified example, the arithmetic processor 1 checks whether or not the supply of electric power to the printer 6 (engine controller 60) has been stopped (Step #13). The arithmetic processor 1 checks whether or not the supply of electric power to the printer 6 has been stopped. The supply of electric power to the individual supply-stop parts (individual components) is stopped in the previously defined order, with the previously defined timing. Accordingly, the arithmetic processor 1 may make the check based on the time from the start of the transition period to the time point of occurrence of the error. The arithmetic processor 1 may make the check by transmitting a signal to the engine controller 60 and checking whether there is a response from the engine controller 60.

When the supply of electric power to the printer 6 has already been stopped (at or after the branch time point; Step #13, Yes), the flow proceeds to Step #12. The transition to energy-saving mode is not cancelled. The arithmetic processor 1 performs recovery preparation processing. The arithmetic processor 1 makes the multifunction peripheral 100 make a transition to energy-saving mode temporarily.

On the other hand, when the supply of electric power to the printer 6 has not yet been stopped (before the branch time point; Step #13, No), the arithmetic processor 1 cancels the transition to energy-saving mode. The arithmetic processor 1 then makes the multifunction peripheral 100 return to normal mode (Step #14). Specifically, the arithmetic processor 1 instructs the power controller 93 to end the suspension of supply of electric power to the supply-stop parts. The arithmetic processor 1 also instructs the power controller 93 to restart supply of electric power to the supply-stop parts to which the supply of electric power has already been stopped. In response to the instruction, the power controller 93 restarts supply of electric power to the supply-stop parts. The arithmetic processor 1 makes the indicator (the display panel 41 or the communicator 7) indicate the occurrence of the error and the content of the error occurred (Step #15, then END).

As described above, the image forming apparatus (multifunction peripheral 100) according to the embodiment has a normal mode and an energy-saving mode in which the supply of electric power to previously defined supply-stop parts is stopped so as to consume less electric power than in normal mode. The image forming apparatus includes a plurality of components, a power supply 9, a monitor 8, an automatic recovery signal generator, and an arithmetic processor 1. The components (a storage 3, an operation panel 4, a document transport 5a, an image reader 5b, a printer 6, a communicator 7), of which all or part are the supply-stop parts, constitute the image forming apparatus. The power supply 9 supplies electric power to the supply-stop parts in normal mode. The power supply 9 stops supplying electric power to the supply-stop parts in energy-saving mode. The monitor 8 operates by being supplied with electric power from the power supply 9 when transition to energy-saving mode starts. The monitor 8 stops operating in normal mode. On receiving in energy-saving mode an interrupt signal indicating occurrence of a recovery factor from an interruption signal generator (an operation detection sensor 80, a touch panel 42, a computer 200), the monitor 8 makes the power supply 9 restart supply of electric power to the supply-stop parts to make the image forming apparatus return to normal mode. The automatic recovery signal generator (a timer circuit 22, an RTC circuit 23, a computer 200) inputs to the monitor 8 an automatic recovery signal S1, which is a kind of interrupt signal, after completion of the transition to energy-saving mode. The arithmetic processor 1 is one of the supply-stop parts. On recognizing a transition condition to energy-saving mode to be fulfilled in normal mode, the arithmetic processor 1 determines transition to energy-saving mode. The arithmetic processor 1 makes the power supply 9 stop supply of electric power to the respective supply-stop parts sequentially during the transition period starting at determination of the transition to energy-saving mode and ending at completion of the transition to energy-saving mode. When an error occurs during the transition period, the arithmetic processor 1 performs recovery preparation processing to input the automatic recovery signal S1 to the monitor 8 after completion of the transition to energy-saving mode.

With the above configuration, when an error occurs during the transition period to energy-saving mode, a transition to energy-saving mode is made temporarily. Thereafter, immediately and automatically, a return to normal mode is made. That is, after transition to energy-saving mode, the arithmetic processor 1 and the components (supply-stop parts) are restarted. Thus, the error is not left unattended to for a long time. When an error occurs in the middle of the process of transition to energy-saving mode, it may also be possible to suspend transition to energy-saving mode and return to normal mode. However, such interruption and return require complicated processing. A complicated control program needs to be developed. By contrast, the arithmetic processor 1 according to the present disclosure basically does not interrupt transition to energy-saving mode. The arithmetic processor 1 proceeds with transition to energy-saving mode. After completion of transition to energy-saving mode, a return to normal mode is made. This helps avoid complicated processing. It is no longer necessary to develop a complicated control program for interruption and return.

Moreover, the part (the monitor 8) that detects a recovery factor to normal mode is started during transition to energy-saving mode. The monitor 8 continues to operate even after completion of transition to energy-saving mode. Thus, an error that occurs during the transition period to energy-saving mode greatly affects the monitor 8. An error occurring during the transition period may cause the monitor 8 to lock (freeze). With the monitor 8 locked, no return to normal mode may be possible. However, when an error occurs during the transition period, a return to normal mode is made automatically. This prevents disability to return to normal mode. Return to normal mode resets the monitor 8. The monitor 8 can be unlocked automatically.

The image forming apparatus according to the embodiment includes an indicator (a display panel 41, a communicator 7) which issues an indication. When the image forming apparatus returns to normal mode in response to the automatic recovery signal S1, the arithmetic processor 1 checks whether or not the error that occurred during the transition period has been resolved so that, when the error has been resolved, the arithmetic processor 1 makes the power supply 9 stop supply of electric power to the supply-stop parts sequentially to bring the image forming apparatus into the energy-saving mode and, when the error has not been resolved, the arithmetic processor 1 makes the indicator indicate that the error has not been resolved. With this configuration, when restarting the supply-stop parts resolves the error, the image forming apparatus can be brought into energy-saving mode promptly. After return to normal mode, energy-saving mode can be resumed promptly. On the other hand, when return to normal mode does not resolve the error, the user can be notified of occurrence of the error promptly.

During the transition period, the power supply 9 stops supply of electric power to the arithmetic processor 1 last among the plurality of supply-stop parts. With this configuration, it is possible to continue checking for an error during transition to energy-saving mode up to immediately before completion of transition to energy-saving mode.

The automatic recovery signal generator is provided within the image forming apparatus. The automatic recovery signal generator may be a timer circuit 22. The timer circuit 22 makes the level of its output signal rise or fall every predetermined time to input the output signal as the automatic recovery signal S1 to the monitor 8. When an error occurs during the transition period, the arithmetic processor 1 gives the power supply 9 an instruction to continue supply of electric power to the timer circuit 22 even after completion of transition to energy-saving mode (recovery preparation processing). When no error occurs during the transition period, the power supply 9 stops supply of electric power to the timer circuit 22 after completion of transition to energy-saving mode. Immediately after completion of transition to energy-saving mode, the timer circuit 22 inputs the automatic return signal S1 (interrupt signal) to the monitor 8. Thus, the image forming apparatus can be brought back into normal mode approximately at the same time as completion of transition to energy-saving mode.

The automatic recovery signal generator may be an RTC circuit 23 that uses a battery as a power source, is connected to the monitor 8, and counts time. When an error occurs during the transition period, the arithmetic processor 1 gives the RTC circuit 23 an instruction to input the automatic recovery signal S1 to the monitor 8 after completion of transition to the energy-saving mode (recovery preparation processing). According to the instruction from the arithmetic processor 1, the RTC circuit 23 inputs the automatic recovery signal S1 to the monitor 8 at a specified time point. Thus, the RTC circuit 23 inputs the automatic return signal S1 (interrupt signal) to the monitor 8 immediately after completion of transition to energy-saving mode. In this way, after completion of transition to energy-saving mode, the automatic return signal S1 (interrupt signal) can be input to the monitor 8 promptly. The image forming apparatus can be brought back into normal mode approximately at the same time as completion of transition to energy-saving mode.

The automatic recovery signal generator is a communicator 7 that conducts communication with a computer 200 via a network 300 or the monitor 8. The monitor 8 is connected to the network 300 in energy-saving mode. The power supply 9 stops supplying electric power to the communicator 7 during the transition period. When an error occurs during the transition period, the arithmetic processor 1 gives the communicator 7 or the monitor 8 an instruction to issue to the computer 200 a request to send the automatic recovery signal S1 to the image forming apparatus (multifunction peripheral 100) (recovery preparation processing). The request is transmitted toward the computer 200. The monitor 8 recognizes the automatic recovery signal S1 from the computer 200 returned in response to the request after completion of transition to energy-saving mode. Thus, simply with a request issued from the communicator 7 or the monitor 8, after transition to energy-saving mode, the automatic return signal S1 (interrupt signal) is input to the monitor 8 promptly. Moreover, no special circuit is required for processing for generating the automatic return signal S1.

During the transition period, the arithmetic processor 1 recognizes occurrence of a noise intrusion error on being notified of intrusion of noise by the monitor 8. The arithmetic processor 1 recognizes occurrence of an abnormal packet receipt error on being notified of receipt of an abnormal packet by the communicator 7 or the monitor 8. The arithmetic processor 1 recognizes occurrence of a failure error on being notified of occurrence of failure by the components. The arithmetic processor 1 may perform the recovery preparation processing only on recognizing one or more of these errors. In this way, a return to normal mode based on the automatic return signal S1 can be made only on occurrence of an error that tends to make the monitor 8 lock, an error that tends to make return to normal mode impossible, or an error such as failure of the image forming apparatus of which the user should necessarily be notified promptly.

Processing for stopping supply of electric power to the printer 6 during transition to energy-saving mode and then returning to normal mode may be complicated. Rather, making a transition to energy-saving mode temporarily and then restarting in the normal mode can make it easier to start up the printer 6 in a simple manner, without an error. Accordingly, when an error occurs during the transition period when or after supply of electric power to the printer 6 is stopped, the arithmetic processor 1 performs the recovery preparation processing. When an error occurs during the transition period before supply of electric power to the printer 6 is stopped, the arithmetic processor 1 has supply of electric power restarted to the supply-stop parts to which supply of electric power has already been stopped (thereby cancelling transition to energy-saving mode). This eliminates the need to develop a complicated program. Moreover, the printer 6 can restarted promptly without an error.

When the recovery preparation processing is performed, the supply of electric power of the arithmetic processor 1 is stopped momentarily in a resetting-like fashion. What is stored in the arithmetic processor 1 and the storage 3 may be lost. Accordingly, as the recovery preparation processing, the arithmetic processor 1 notifies the monitor 8 of the content of the error occurred. When a transition to energy-saving mode is made with the recovery preparation processing performed and then a return to normal mode is made, the monitor 8 notifies the arithmetic processor 1 that the return to normal mode this time is based on the recovery preparation processing. Moreover, the monitor 8 notifies the arithmetic processor 1 of the content of the error. The arithmetic processor 1 that has restarted can recognize whether or not the return is based on the recovery preparation processing. Moreover, the arithmetic processor 1 that has restarted can recognize the content of the error that occurred during the transition period.

Although an embodiment of the present disclosure has been described above, it is in no way meant to limit the scope of the present disclosure. The present disclosure can be implemented with many modifications made without departing from the spirit of the present disclosure.

What is claimed is:

1. An image forming apparatus having a normal mode and an energy-saving mode in which supply of electric power to previously defined supply-stop parts is stopped to consume less electric power than in the normal mode, the image forming apparatus comprising:
   a plurality of components which constitute the image forming apparatus and of which all or part are the supply-stop parts;
   a power supply which supplies electric power to the supply-stop parts in the normal mode but stops supplying electric power to the supply-stop parts in the energy-saving mode;
   a power supply monitoring controller which operates by being supplied with electric power from the power supply when transition to the energy-saving mode starts, the power supply monitoring controller stopping operating in the normal mode, the power supply monitoring controller, on receiving in the energy-saving mode an interrupt signal indicating occurrence of a recovery factor from an interruption signal generator, making the power supply restart supply of electric power to the supply-stop parts to make the image forming apparatus return to the normal mode;
   an automatic recovery signal generator which includes a circuit or a plurality of circuits and which inputs to the power supply monitoring controller an automatic recovery signal, which is a kind of the interrupt signal, after completion of the transition to the energy-saving mode; and
   an arithmetic processor which is one of the supply-stop parts, the arithmetic processor determining transition to the energy-saving mode on recognizing a transition condition to the energy-saving mode to be fulfilled in the normal mode, the arithmetic processor making the power supply stop supply of electric power to the respective supply-stop parts sequentially during a transition period starting at determination of the transition to the energy-saving mode and ending at completion of the transition to the energy-saving mode, the arithmetic processor, when an error occurs during the transition period, performing recovery preparation processing to input the automatic recovery signal to the power supply monitoring controller after completion of the transition to the energy-saving mode.

2. The image forming apparatus of claim 1, further comprising:
   an indicator which issues an indication, wherein
   when the image forming apparatus returns to the normal mode in response to the automatic recovery signal,
   the arithmetic processor checks whether or not the error that occurred during the transition period has been resolved so that, when the error has been resolved, the arithmetic processor makes the power supply stop supply of electric power to the supply-stop parts sequentially to bring the image forming apparatus into the energy-saving mode and, when the error has not been resolved, the arithmetic processor makes the indicator indicate that the error has not been resolved.

3. The image forming apparatus of claim 1, wherein during the transition period,
   the power supply stops supply of electric power to the arithmetic processor last among the plurality of supply-stop parts.

4. The image forming apparatus of claim 1, wherein the automatic recovery signal generator is a timer circuit that is provided within the image forming apparatus, the timer circuit making a level of an output signal thereof rise or fall every predetermined time to input the output signal as the automatic recovery signal to the power supply monitoring controller, when an error occurs during the transition period, the arithmetic processor, as the recovery preparation processing, gives the power supply an instruction to continue supply of electric power to the timer circuit even after completion of the transition to the energy-saving mode, and when no error occurs during the transition period, the power supply stops supply of electric power to the timer circuit after completion of the transition to the energy-saving mode.

5. The image forming apparatus of claim 1, wherein the automatic recovery signal generator is an RTC circuit that is provided within the image forming apparatus, the RTC circuit using a battery as a power source, being connected to the power supply monitoring controller, and counting time, when an error occurs during the transition period, the arithmetic processor, as the recovery preparation processing, gives the RTC circuit an instruction to input the automatic recovery signal to the power supply monitoring controller after completion of the transition to the energy-saving mode, and the RTC circuit inputs the automatic recovery signal to the power supply monitoring controller at a time point specified in the instruction from the arithmetic processor.

6. The image forming apparatus of claim 1, wherein the automatic recovery signal generator is a communicator that conducts communication with a computer via a network or the power supply monitoring controller, the power supply monitoring is connected to the network in the energy-saving mode, the power supply stops supplying electric power to the communicator during the transition period, when an error occurs during the transition period, the arithmetic processor, as the recovery preparation processing, gives the communicator or the power supply monitoring controller an instruction to issue a request to the computer, the request being a request to send the automatic recovery signal to the image forming apparatus, and the power supply monitoring controller recognizes the automatic recovery signal from the computer returned in response to the request after completion of the transition to the energy-saving mode.

7. The image forming apparatus of claim 1, wherein during the transition period, the arithmetic processor recognizes occurrence of a noise intrusion error on being notified of intrusion of noise by the power supply monitoring controller, recognizes occurrence of an abnormal packet receipt error on being notified of receipt of an abnormal packet by the communicator or the power supply monitoring controller, recognizes occurrence of a failure error on being notified of occurrence of failure by the components, and performs the recovery preparation processing only on recognizing one or more of the errors.

8. The image forming apparatus of claim 1, further comprising:

a printer which performs printing, wherein the printer is one of the supply-stop parts, when an error occurs during the transition period after the printer stops being supplied with electric power, the arithmetic processor performs the recovery preparation processing, and when an error occurs during the transition period before the printer stops being supplied with electric power, the arithmetic processor cancels the transition to the energy-saving mode by having supply of electric power restarted to the supply-stop parts to which supply of electric power has already been stopped.

9. The image forming apparatus of claim 1, wherein the arithmetic processor, as the recovery preparation processing, notifies the power supply monitoring controller of content of the error occurred, and when a transition to the energy-saving mode is made with the recovery preparation processing performed and then a return to the normal mode is made, the power supply monitoring controller notifies the arithmetic processor that the return to the normal mode this time is a return based on the recovery preparation processing.

10. The image forming apparatus of claim 1, wherein the arithmetic processor, as the recovery preparation processing, notifies the power supply monitoring controller of content of the error occurred, and when a transition to the energy-saving mode is made with the recovery preparation processing performed and then a return to the normal mode is made, the power supply monitoring controller notifies the arithmetic processor of the content of the error.

11. A method for controlling an image forming apparatus, comprising:

providing a normal mode;

providing an energy-saving mode in which supply of electric power to previously defined supply-stop parts is stopped to consume less electric power than in the normal mode;

supplying electric power to the supply-stop parts in the normal mode;

stopping supply of electric power to the supply-stop parts in the energy-saving mode;

the supply-stop parts being all or part of a plurality of components which constitute the image forming apparatus;

making a power supply monitoring controller operate by supplying electric power thereto when starting transition to the energy-saving mode;

making the power supply monitoring controller stop operating in the normal mode;

when the power supply monitoring controller receives in the energy-saving mode an interrupt signal indicating occurrence of a recovery factor from an interruption signal generator, having supply of electric power restarted to the supply-stop parts to make the image forming apparatus return to the normal mode;

when a transition condition to the energy-saving mode is fulfilled in the normal mode, determining transition to the energy-saving mode;

stopping supply of electric power to the respective supply-stop parts sequentially during a transition period starting at determination of the transition to the energy-saving mode and ending at completion of the transition to the energy-saving mode;

when an error occurs during the transition period, performing recovery preparation processing to input the automatic recovery signal to the power supply monitoring controller after completion of the transition to the energy-saving mode; and the automatic recovery signal being a kind of the interrupt signal.

* * * * *